(12) United States Patent
McCormick

(10) Patent No.: US 7,943,225 B2
(45) Date of Patent: May 17, 2011

(54) VENTED INSULATING LINER METHOD AND APPARATUS

(75) Inventor: Bruce McCormick, Santa Fe, NM (US)

(73) Assignee: Polar Wrap, LLC, Memphis, TN (US)

( * ) Notice: Subject to any disclaimer, the term of this patent is extended or adjusted under 35 U.S.C. 154(b) by 1137 days.

(21) Appl. No.: 11/277,591

(22) Filed: Mar. 27, 2006

(65) Prior Publication Data

US 2007/0224390 A1 Sep. 27, 2007

(51) Int. Cl.
*B23B 3/24* (2006.01)
(52) U.S. Cl. ............ 428/137; 428/76; 428/69; 156/286
(58) Field of Classification Search .................. 428/137, 428/76, 69; 156/286
See application file for complete search history.

(56) References Cited

U.S. PATENT DOCUMENTS

| | | | |
|---|---|---|---|
| 4,525,406 A * | 6/1985 | Pollock | ........................ 428/137 |
| 4,590,689 A | 5/1986 | Rosenberg | |
| 4,658,515 A | 4/1987 | Oatman | |
| 4,726,870 A | 2/1988 | McWilliams et al. | |
| 5,181,287 A | 1/1993 | Yang | |
| 5,220,791 A | 6/1993 | Bulzomi | |
| 5,271,980 A * | 12/1993 | Bell | ................................. 428/68 |
| 5,369,257 A | 11/1994 | Gibbon | |
| 5,669,161 A | 9/1997 | Huang | |
| 5,722,482 A | 3/1998 | Buckley | |
| 6,004,662 A | 12/1999 | Buckley | |
| 6,125,645 A | 10/2000 | Horn | |
| 6,183,855 B1 | 2/2001 | Buckley | |
| 6,319,599 B1 | 11/2001 | Buckley | |
| 6,367,172 B2 | 4/2002 | Hernandez | |
| 6,464,672 B1 | 10/2002 | Buckley | |
| 6,493,881 B1 | 12/2002 | Picotte | |
| 6,613,953 B1 | 9/2003 | Altura | |
| 6,677,026 B1 * | 1/2004 | Yates | ............................. 428/137 |
| 6,704,943 B2 * | 3/2004 | Calonge Clavell | ................ 2/411 |
| 6,855,410 B2 | 2/2005 | Buckley | |
| 6,859,364 B2 | 2/2005 | Yuasa et al. | |
| 2001/0005946 A1 | 7/2001 | Brown | |
| 2002/0094426 A1 | 7/2002 | Stepanian et al. | |
| 2002/0164474 A1 | 11/2002 | Buckley | |
| 2002/0193498 A1 | 12/2002 | Brown | |

(Continued)

FOREIGN PATENT DOCUMENTS

| WO | WO03/097227 | 11/2003 |
|---|---|---|
| WO | WO2006/009921 | 1/2006 |
| WO | WO2007/131028 | 11/2007 |

OTHER PUBLICATIONS

A Breakthrough in Advanced Materials, Aspen Aerogels, Inc. (2 pgs) www.aerogels.com, 2003.

(Continued)

*Primary Examiner* — William P Watkins, III
(74) *Attorney, Agent, or Firm* — Reising Ethington P.C.

(57) ABSTRACT

An insulating liner for an article of clothing includes an insulating layer including an aerogel material and having opposite sides with passages extending therebetween, and a cover encapsulating the insulating layer. The cover includes vent holes aligned with the passages of the insulating layer, and has portions that extend into the passages of the insulating layer from the opposite sides of the insulating layer, with the portions having vent holes therethrough and being sealed about the periphery of the vent holes. A valve may be provided with the liner to allow gas to be withdrawn or expelled from the liner. Methods of forming the insulating liner(s) are also provided.

28 Claims, 2 Drawing Sheets

U.S. PATENT DOCUMENTS

| | | |
|---|---|---|
| 2004/0018336 A1 | 1/2004 | Farnworth |
| 2004/0107482 A1 | 6/2004 | Picotte |
| 2004/0142149 A1 | 7/2004 | Mollendorf et al. |
| 2004/0209061 A1 | 10/2004 | Farnworth |
| 2005/0100728 A1 | 5/2005 | Ristic-Lehmann et al. |
| 2005/0143515 A1 | 6/2005 | Ristic-Lehmann et al. |
| 2005/0175799 A1 | 8/2005 | Farnworth |
| 2005/0281988 A1 | 12/2005 | McCormick |
| 2006/0035054 A1 * | 2/2006 | Stepanian et al. ............. 428/76 |

OTHER PUBLICATIONS

International Search Report for Application No. PCT/US07/65019; Jun. 18, 2008, 1 page.
International Search Report for Application No. PCT/US07/68019; Nov. 15, 2007, 1 page.
Supplementary European Search Report for Application No. PCT/US07/065019, Aug. 6, 2009, 2 pages.

* cited by examiner

VENTED INSULATING LINER METHOD AND APPARATUS

TECHNICAL FIELD

This invention relates generally to clothing and garment articles and, more particularly, to insulating garments as well as insulating garment articles such as footwear liners or other clothing inserts that are used in conjunction with an article of clothing.

BACKGROUND OF THE INVENTION

Incorporation of insulating liners with the use of an article of clothing is known. As used herein, "clothing", "garment", or "article of clothing" includes not only under and outer wear (shirts, blouses, jackets, coats, pants, shorts, skirts, underwear, etc.), but also such things as footwear, gloves, blankets, sleeping bags, and other articles used to provide protection or comfort against the elements. Such insulating liners, when used in combination with the overlaying article of clothing, shield the user against uncomfortably cold or hot temperatures and high levels of moisture. Various insulating materials for insulating liners that have been used in the textile industry include felt, fleece, flannel, wool, various forms of latex foam, or the like. Although flexible and readily adaptable for textile applications, such materials are often provided in relatively thick slabs that can be bulky, thereby requiring the user to use, for example, a larger sized garment in order to fit the insulating insert or liner. Also, such materials often do not exhibit effective insulative properties in extremely high or extremely low temperature-related environments. Moreover, some advanced materials are designed to keep a user warm, like Thinsulate™, or dry, like GoreTEX™, but not both warm and dry.

Silica aerogels have been known to exhibit excellent thermal insulation performance and have been readily adapted for use in high temperature thermal insulation and cryogenic thermal insulation applications including, for example, advanced space suit designs by NASA. Aerogels, as that term is used herein, include polymers with pores with less than 50 nanometers in porous diameter. In a process known as sol-gel polymerization, monomers are suspended in solution and react with one another to form a sol, or collection, of colloidal clusters. The larger molecules then become bonded and cross-linked, forming a nearly solid and transparent sol-gel. An aerogel of this type can be produced by carefully drying the sol-gel so that the fragile network does not collapse. Thermal insulation blankets using aerogels have been developed, and aerogel materials are now commercially available in which the aerogel is impregnated or otherwise incorporated into a carbon or polyester based media.

One difficulty with using silica aerogels is that the aerogel tends to be dusty, even when supported by a carrier material. If the aerogel material is not properly contained and sealed within a liner assembly, the dust particles may escape the liner into the atmosphere thereby diminishing the effective insulative life of the insulating liner. Another difficulty with using silica aerogels is that an insulating liner assembly having aerogel may not effectively breathe or allow transfer of air and moisture between opposing sides of the liner.

Thus, it is an object of the present invention to provide an insulating liner for an article of clothing that effectively insulates against hot and cold temperature conditions, while reducing or even eliminating the loss of aerogel dust, yet allowing transfer of at least some air and moisture between opposing sides of the liner.

SUMMARY OF THE INVENTION

In accordance with one aspect of the present invention, an insulating liner for an article of clothing includes an insulating layer including an aerogel material and having opposite sides with passages extending therebetween, and a cover encapsulating the insulating layer. The cover includes vent holes aligned with the passages of the insulating layer, and has portions that extend into the passages of the insulating layer from the opposite sides of the insulating layer, with the portions having vent holes therethrough and being sealed about the periphery of the vent holes.

In accordance with another aspect of the present invention, an insulating liner for an article of clothing includes an insulating layer including an aerogel material and having opposite sides with a plurality of passages extending therebetween, and further includes a cover encapsulating the insulating layer and including a sealed valve to allow gas within the liner to pass therethrough.

In accordance with a further aspect of the present invention, a method of forming an insulating liner for an article of clothing includes the steps of: providing at least one insulating layer having a plurality of passages therethrough; providing first and second sheets of an impermeable polymeric material; encapsulating the at least one insulating layer between the first and second sheets; cutting the first and second sheets to a desired shape; sealing the first and second sheets together within the passages of the at least one insulating layer; and forming a plurality of vent holes through the first and second sheets at the plurality of passages.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
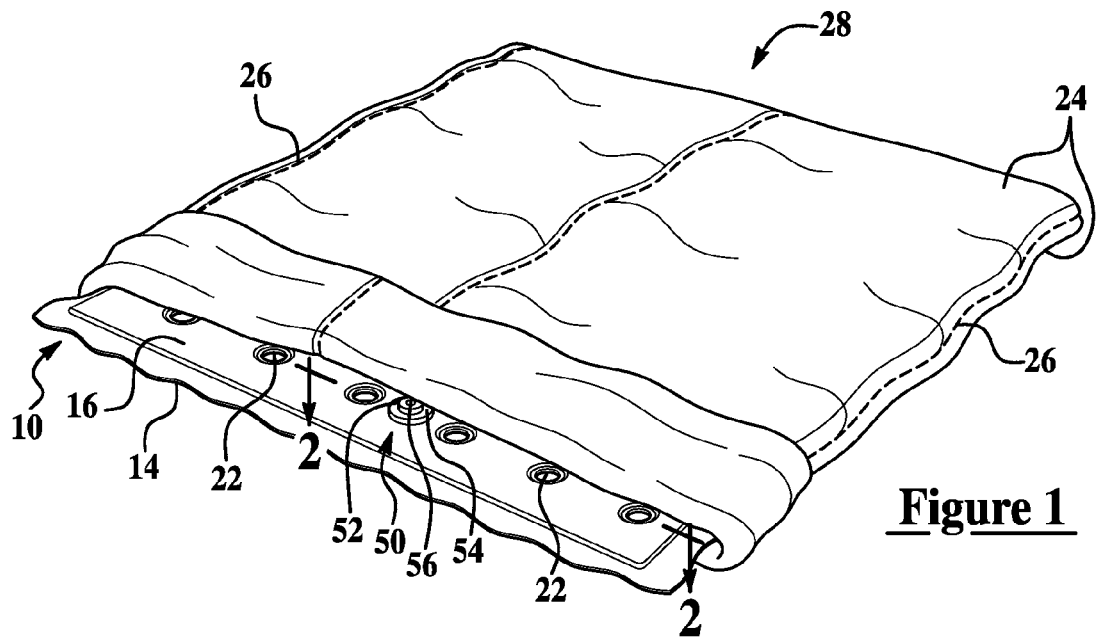
FIG. 1 is a perspective view of an insulation assembly including an insulating liner disposed between permeable insulation layers.
Figure 2:
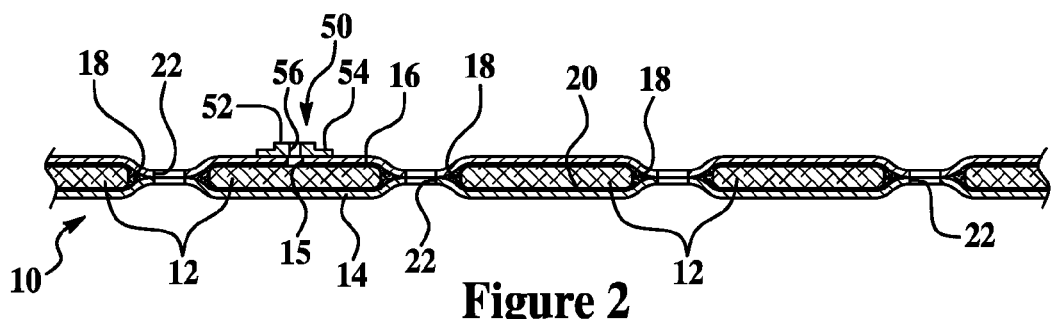
FIG. 2 is a cross-sectional view taken along line 2-2 of the insulating liner shown in FIG. 1.

With reference to the drawings, FIGS. 1 and 2 depict a multiple layer insulating liner 10 comprising an aerogel-containing insulating layer 12 encapsulated within a liner cover defined by two support layers 14, 16, which are preferably hermetically sealed together. Those skilled in the art will recognize that the liner cover may also be defined by a single component such as a unitary sleeve, or a sheet folded and affixed to itself to define a sleeve or the like. The insulating layer 12 is a relatively thin layer of material that is composed of a dust generating aerogel composite including a nonporous silica matrix supported or carried by a polymeric, fibrous substrate. The insulating layer 12 may be die-cut to define its periphery and to define a plurality of passages 18 therethrough. The insulating layer 12 is disposed on an upper surface 20 of the first support layer 14 and the second support layer 16 is disposed over the insulating layer 12. The first and second support layers 14, 16 are affixed at their sealed peripheral margin about the periphery of the insulating layer 12 to encapsulate the insulating layer 12 between the support layers 14, 16. As used herein, the term affix includes but is not limited to fusing, welding, bonding or adhering with or without adhesive, and/or fastening with or without fasteners.

The first and second support layers 14, 16 have portions that extend into the passages 18 of the insulating layer 12 from opposite sides thereof, which portions are affixed together and have a plurality of vent holes 22 therethrough at the vent passages 18 to permit air flow through the insulating liner 10 from one side thereof to the other and vice-versa. The quantity, size, spacing, and pattern of the passages 18 and vent holes 22 can be varied according to the particular application.

The sealed insulating layer 12 and support layers 14, 16 define the insulating liner 10, which may be carried between permeable insulation layers 24, such as wool, down, or cotton, or synthetic fabrics such as polyester, propylene, Thinsulate® from 3M, or the like. The permeable insulation layers 24 are preferably relatively thicker, in a free state, than the insulating liner 10 and thereby provide more spacing between the insulating liner 10 and the surface of the user's skin. The permeable insulation layers 24 may be two separate layers or may be a single layer folded over onto either side of the insulating liner 10. In either case, the layers 24 may be sewn together at one or more of their edges with stitching 26, which may be sewn through the sealed peripheral margin of the support layers 14, 16 to fasten the layers 24 to the support layers 14, 16 and thereby define an insulation assembly 28.

The insulating layer 12 is composed of a carrier material impregnated with an aerogel composite. Studies have shown that aerogel composites demonstrate superior insulative properties as opposed to other insulators conventionally used in textile, garment and footwear applications. Based upon their chemical structures, aerogels can have low bulk densities of about 0.15 g/cm$^3$ or less, and more preferably of about 0.03 to 0.3 g/cm$^3$, very high surface areas of generally from about 400 to 1,000 m$^2$/g and higher, and more preferably of about 700 to 1000 m$^2$/g, high porosity of about 95% and greater, and more preferably greater than about 97% porosity, and relatively large pore volume with more than about 3.8 mL/g, and more preferably with about 3.9 mL/g and higher. The combination of these properties in an amorphous structure provides low thermal conductivity values of about 9 to 16 mW/m-K at 37° C. and 1 atmosphere of pressure for any coherent solid material.

The carrier used in insulating layer 12 is a polymeric fibrous material that effectively carries the aerogel composite material with it. The carrier itself can be a carbon-based material, such as a carbon felt or other fibrous material, or can be formed from polyester or any other material suitable for supporting and retaining the aerogel within the carrier. The fibrous material may include a single type of polymer fiber or may include a combination or matrix of fibers and is somewhat bulky, as compared to the aerogel, and includes some resilience preferably with some bulk recovery. The use of the carrier minimizes the volume of unsupported aerogel while avoiding degradation of the thermal performance thereof. Also, the carrier permits the aerogel to be available in the form of a bulk supply of insulation material, such as a sheet or a roll, that contains one continuous sheet or strip that may be easily cut to any desirable size and/or shape using conventional textile cutting tools such as die cutting machines, for example. The carrier further provides the aerogel material in a very flexible state that is very manageable for textile, footwear and other similar applications. Suitable aerogel materials for use in the present invention include the Spaceloft™ AR3101, AR3102 and AR3103 materials as well as Pyrogel™ AR5401, all of which are manufactured by Aspen Aerogels, Inc. of Marlborough, Mass.

The support layers 14, 16 are generally composed of an organic polymeric material, such as a vinyl, nylon, polystyrene, polypropylene, polyvinyl chloride (PVC), or the like. The support layer material is structurally intact, yet flexible, can be easily cut to a desired size and shape, and is preferably easily weldable to like materials. The support layers 14, 16 are preferably composed of the same material but, depending on the application, may be dissimilar materials. For example, the support layers 14, 16 are preferably composed of a clear vinyl having a thickness in the range of about 1/64th of an inch to about 3/64th of an inch, although any suitable thickness may be used. Clear vinyl is just one example of a suitable material that is impermeable to air and capable of being hermetically sealed to another layer of the same material. Other suitable materials will be known to those skilled in the art.

According to a preferred aspect of the liner 10, its thermal conductivity can be reduced to yield an increase in the insulative performance of the liner 10. Thermal conductivity of an insulating material is determined by the sum of the following three mechanisms: solid conductivity, radiative or infrared transmission, and gaseous conductivity. Solid conductivity is an intrinsic property of a specific material. For example, solid conductivity is relatively high for dense silica like a single-pane window. In contrast, silica aerogels possess only about a 1 to 10% fraction of solid silica and consist of very small particles linked in a three-dimensional network with many dead-ends. Therefore, thermal transport through the solid portion of silica aerogel occurs through a very tortuous path and is not particularly significant. Moreover, radiative transmission of silica aerogels is relatively low at low temperatures and also not particularly significant. However, the space not occupied by solids in an aerogel under atmospheric pressure conditions is normally filled with air or other gases. Such air or gases transport thermal energy through the aerogel.

Therefore, it is desirable to minimize the gaseous conductivity portion of aerogel thermal conductivity. The mean pore diameter of an aerogel is relatively fine and similar in magnitude to the mean free path of nitrogen and oxygen molecules at standard temperatures and pressures. When the mean free path of a gas, such as nitrogen or oxygen, is greater than the pore diameter of an aerogel, the gas molecules collide more frequently with the pore walls than with each other. Accordingly, the thermal energy of the gas is transferred to the aerogel solid portion, which due to its low intrinsic conductivity effectively slows thermal transfer.

Therefore it is desirable to increase the size of the mean free path relative to the aerogel mean pore diameter. The mean pore diameter of the aerogel may be increased in the following ways: filling the aerogel with a gas with a lower molecular mass (and, thus, a longer mean free path) than air; reducing the pore diameter of the aerogel; and lowering the gas pressure within the aerogel. The greatest improvement is found by reducing the gas pressure within the aerogel and, it is only necessary to reduce the gas pressure enough to increase the size of the mean free path of the gas relative to the mean pore diameter of the aerogel. For most aerogels a reduction in gas pressure on the order of 50 Torr is sufficient and desirable. Preferably, the gas pressure is reduced in a range from about 25 to 75 Torr.

For the reasons discussed above, it is desirable to encapsulate the aerogel insulating layer 12 with an air tight seal and even more desirable to provide the interior of the liner 10 with at least a reduced pressure condition therein and preferably a vacuum or negative pressure condition. Accordingly, the insulating liner 10 may be provided with an air escape valve 50 such that air or other gas may be expelled or removed from within the liner 10 to reduce the gas pressure on the aerogel material. The air escape valve 50 is preferably sealingly applied to the encapsulating cover such as to one of the support layers 14, 16. In other words, the cover includes a sealed valve. The air escape valve 50 may be any suitable device for allowing air to be expelled or withdrawn from the liner 10.

For example, and as shown, the air escape valve 50 may include a body 52 having a relatively thin flange 54, which may be affixed to an outer surface of the second support layer 14 near a hole 15 therethrough. The body 52 may be composed of any suitable material that allows it to be affixed to the support layer material. For example, the body 52 may be composed of a vinyl material so that it may be thermoformed, high frequency welded, or otherwise affixed to the support layer material. The air escape valve 50 may further include a static valve element such as a pierceable seal 56, which is preferably composed of a resilient material such as a silicone rubber.

To evacuate air or other gas from within the liner 10, a needle of a syringe (not shown) may inserted through the pierceable seal 56, placed in communication with the hole 15 in the support layer 14, whereafter the syringe may be actuated to withdraw air or other gas from within the liner 10. The pierceable seal 56 is disposed within a passage of the body 52 under an interference fit condition. Accordingly, the seal 56 tightly surrounds the needle such that no air or other gas passes therebetween. Moreover, the pierceable seal 56 is thus preferably a self-closing element so that when the syringe needle is removed, the pierceable seal 56 elastically recovers to maintain the hermetic seal of the liner 10. Therefore, the air escape valve 50 enables air or other gas to be vacuumed from the liner 10 using a syringe or other similar device for withdrawing a fluid. Accordingly, the liner 10 may be provided with a reduced pressure condition therein, and preferably a negative pressure or vacuum condition, to enhance the insulative properties of the liner 10.

According to another aspect of encapsulating the aerogel insulating layer 12 with a reduced pressure condition therein, the liner 10 may be assembled in a vacuum chamber such as a vacuum machine or room. Accordingly, such assembly within a negative pressure environment will yield a desired reduction of gas present within the encapsulated aerogel insulation and, thus, the valve 50 need not be included in the liner 10.

In another example, not shown, the air escape valve 50 may instead be a one way valve, or check valve, with a dynamic valve element that is biased to a normally closed position. In this example, a suction device such as syringe, pump, vacuum, or the like may be applied against the one way valve and then activated to pull the dynamic valve element away from its normally closed position and thereby allow air or other gas to be withdrawn from the liner 10. When the suction device is deactivated or removed from the one way valve, the dynamic valve element is biased back to its normally closed position to seal the liner 10. The dynamic valve element may be biased in any suitable manner such as by a separate spring, or by inherent elastic properties of the valve element, or the like. According to another aspect of this example, air or other gas may be expelled, instead of withdrawn, through the one way valve.

In other words, the liner 10 may be compressed to such an extent that the aerogel-containing insulating layer 12 gets compressed to a fraction of its normal height. The insulating layer 12, however, is preferably resilient such that it tends to recover its normal shape after being compressed. Accordingly, a compression force is applied to the liner 10 to expel air or other gas through the one way valve and thereby reduce the interior volume of the liner 10 to substantially the external size of the compressed insulating layer 12. Thereafter, the compression force is released and the compressed insulating layer 12 at least partially recovers its original size and shape thereby tending to at least slightly increase the interior volume of the liner 10. This process tends to yield a reduced pressure condition, and preferably a negative pressure or vacuum condition, within the liner 10 to enhance the insulative properties of the liner 10.

Figure 3:
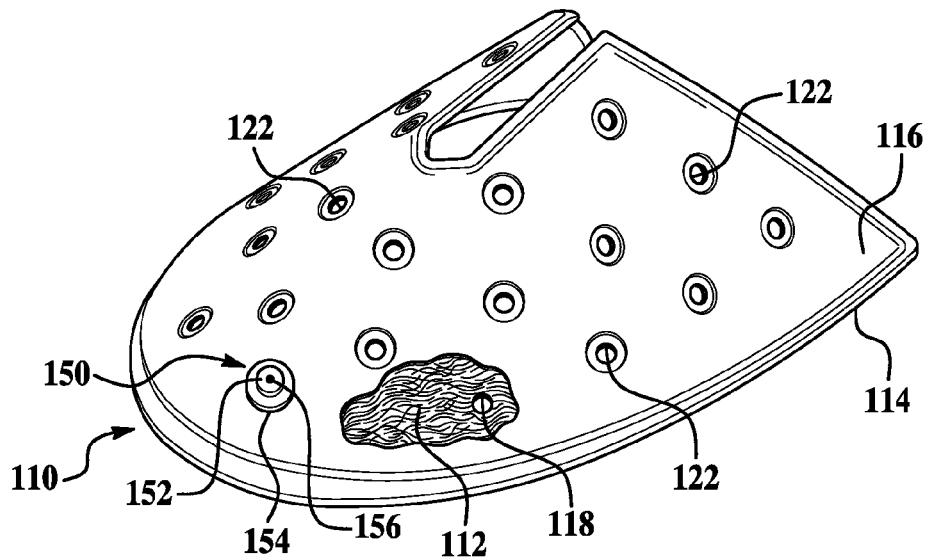
FIG. 3 is a perspective view of an insulating liner for a footwear upper.
Figure 4:
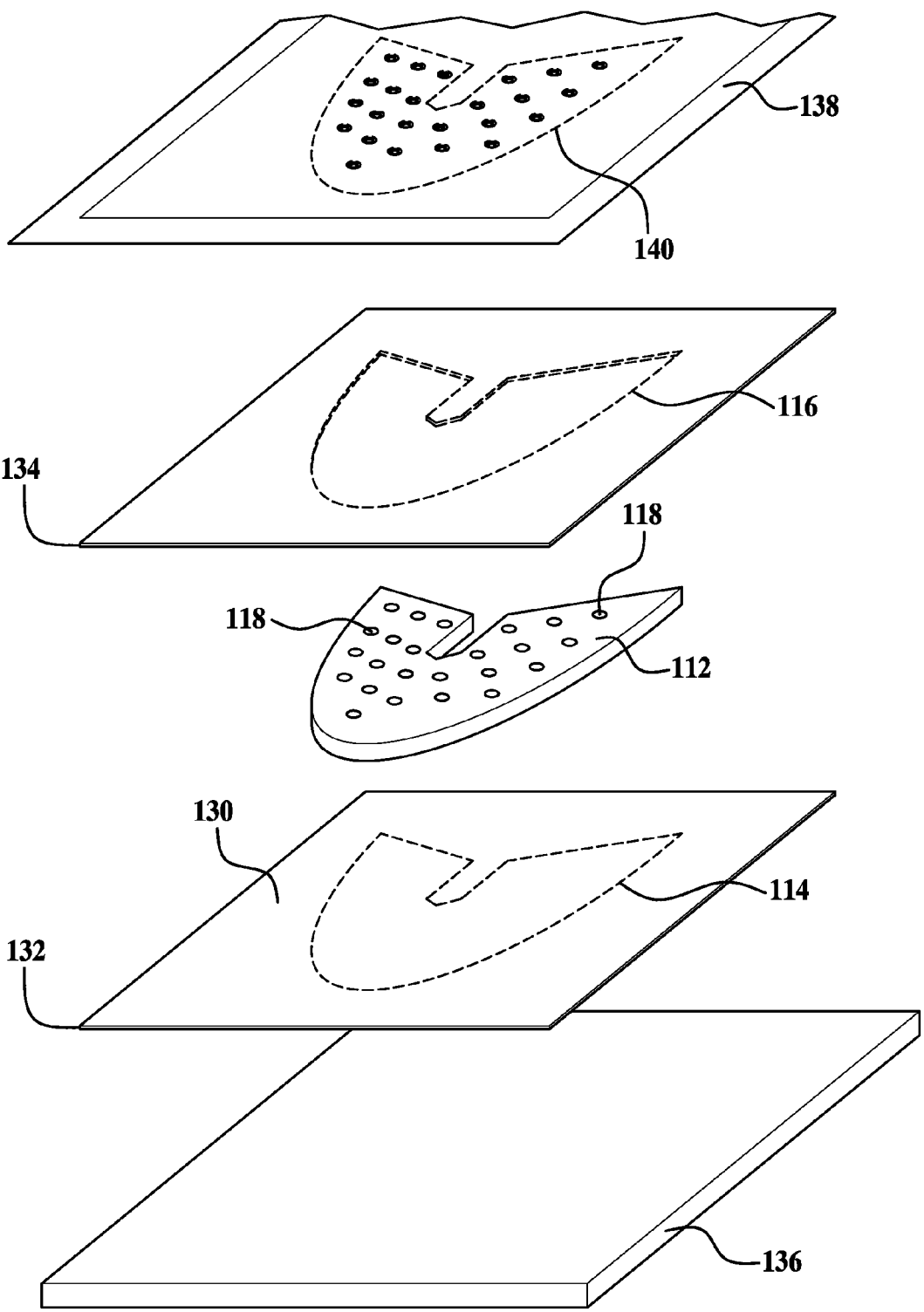
FIG. 4 is an exploded, perspective view of the formation of the insulating liner using the formation process of the present invention.

Turning now to FIGS. 3 and 4, there is illustrated another embodiment of an insulating liner for an article of clothing in the form of a footwear liner 110 such as for a boot, a shoe, or any other footwear article of clothing. This embodiment is similar in many respects to the embodiment of FIG. 1 and like numerals that are offset by 100 between the embodiments generally designate like or corresponding elements throughout the several views of the drawing figures. The manufacturing process for the liner 110 may be substantially similar to that described above, except that no permeable insulation layers are used. Additionally, features of the footwear liner 110 that are not explicitly described hereafter can be implemented in the same manner as described above for the first embodiment.

The footwear liner 110 includes an aerogel-containing insulating layer 112 encapsulated within a liner cover defined by two support layers 114, 116 hermetically sealed together to prevent aerogel dust particles from escaping the footwear liner 110. The insulating layer 112 may be die-cut to define its periphery including a tongue opening and to define a plurality of holes 118 (FIG. 4) therethrough. The insulating layer 112 is disposed on the first support layer 114 and the second support layer 116 is disposed over the insulating layer 112. The first and second support layers 114, 116 are affixed together by a hermetic seal to encapsulate the insulating layer 112 between the support layers 114, 116. The first and second support layers 114, 116 have portions that extend into the holes 118 of the insulating layer 112 from opposite sides thereof, which portions are affixed together and have a plurality of vent holes 122 therethrough at the vent holes 118 to permit air flow through the insulating liner 110 from one side thereof to the other and vice-versa.

Still referring to FIGS. 3 and 4, the insulating liner 110 is formed by the following process. First, the insulating layer 112 is cut and punched to define a suitable size and shape and the plurality of passages 118, and is then laid over an upper surface 130 of a vinyl sheet 132. The vinyl sheet 132, after the forming process of the liner 110 provides the first structural layer 114. Since the vinyl sheet 132 may be provided in various sizes, more than one insulating layer 112 may be provided on the upper surface 130 to thereby form multiple liner assemblies during a single insulating liner manufacturing process.

Second, a second vinyl sheet 134 is disposed over the insulating layer 112, thereby forming the second structural layer 116 of the insulating liner 110.

Third, the periphery of the insulating layers 114, 116 is hermetically sealed by a high frequency (HF) or ultrasonic welder (not shown) including a lower platen 136 and upper die plate 138 having the preferred contours and corresponding features of the liner 110, including its overall shape, and size, and the vent holes 122. For example, the welder can be a high frequency plastic welding machine such as is available from Weldech Electric Industry Co., Ltd. of Taichung, Taiwan (www.weldech.com). The die plate 138 includes one, two, or more outer die-cutting surfaces 140 (only one die cutting surface 140 shown in FIG. 4) for forming one, two or more simultaneous insulating liner assemblies 110. The sheet 132 having the insulating layer 112 thereover, as well as the second sheet 134, are then positioned on the platen 136 below the die plate 138, and the die-cutting surface 140 is aligned with the insulating layer 112.

The die plate 138 presses the two sheets 132, 134 with the insulating layer 112 disposed between them together against the platen 136 while applying a high frequency of about 10-30 KHz to weld the sheets 132, 134 together just outside the periphery of insulating layer 112 and preferably at each of the passages 118 of the insulating layer 112 to thereby encapsulate the insulating layer 112 therebetween with a hermetic seal. Accordingly, peripheral sealed portions of the sheets 132, 134 surround the insulating layer 112 and other portions of the sheets 132, 134 are aligned with and extend into the passages 118 and are sealed together therein. The die plate 138 further die-cuts the periphery of the sheets 132, 134 as well as the portions of the sheets 132, 134 that extend into the passages 118 of the insulating layer 112 and that are welded together therein with suitable pressure exerted on the sheets 132, 134 from the welder. A hermetic seal is thus formed between the now-defined layers 114, 116 at a sealed peripheral margin thereof and the insulating liner 110 is cut and formed having the vent holes 122.

The vent holes 122 can comprise areas where the vinyl layers are compressed tightly together within the corresponding passages 118 through the insulating layer 112. In this arrangement, the vent holes 122 help provide air flow between one side of the liner 110 relatively proximate the user's skin and an opposite side of the liner 110 relatively distal the user's skin. These vent holes 122 thereby allow flow of at least some air and moisture between inner and outer layers of an article of clothing. This latter arrangement is also advantageous during manufacturing since the layers 112, 114, 116 can be tightly compressed by the die plate 138 to squeeze out excess air before hermetically sealing the layers 114, 116 during welding. This compression helps minimize the amount of air trapped in the liner 110 and tends to prevent the dusty aerogel particles from moving, thereby maintaining relatively uniform dispersion of the aerogel within the insulating liner 110. The compression may also expel air or other gas through the one way valve 150 and thereby yield a reduced pressure condition, and preferably a negative pressure or vacuum condition, within the liner 110 to enhance the insulative properties thereof.

The valve 150 may be provided in one or both of the sheets 132, 134 before the layers 114, 116 are defined, or in one or both of the layers 114, 116 after the layers are defined. For example, the sheets 132, 134 may be produced and then a plurality of valves 150 added to the sheets in some predetermined fashion and in some predetermined quantity per area or per length of sheet, such as six valves per square foot or four valves per linear foot. In another example, after the layers 114, 116 are defined, such as by the die plate and platen, one or more valves 150 may be added to the layers 114, 116. The valve(s) 150 may be affixed to the sheets 132, 134 and/or layers 114, 116 in any suitable fashion including thermoforming, high frequency welding, or adhesive attaching. Any suitable quantity, spacing, and pattern of adding the valve(s) 150 to the sheets 132, 134 and/or layers 114, 116 may be used.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above or where the statement specifically refers to "the invention." Various other embodiments and various changes and modifications to the disclosed embodiment(s) will become apparent to those skilled in the art. For example, the insulating liner(s) 10, 110 may further include a cushion layer disposed between the structural layers 14 or 114, and 16 or 116 in addition to the insulating layer(s) 12, 112. Also, although the above description refers to both aerogels and aerogel composites, it will be appreciated by those skilled in the art that the aerogel composites comprise aerogels that have been formed with another substance, and that either aerogels per se or aerogel composites can be used without departing from the scope of the invention. All such other embodiments, changes, and modifications are intended to come within the scope of the appended claims.

As used in this specification and appended claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An insulating liner for an article of clothing, comprising:
    an insulating layer comprising a dust generating aerogel composite that includes a fibrous substrate carrying an aerogel material, said insulating layer having opposite sides with a plurality of passages extending therebetween; and
    a cover hermetically encapsulating said insulating layer and including a plurality of vent holes aligned with said plurality of passages of said insulating layer, said cover having portions that extend into said plurality of passages of said insulating layer from said opposite sides of said insulating layer, with said portions having vent holes therethrough and being sealed about the periphery of said vent holes.

2. An insulating liner as defined in claim 1, wherein said cover comprises:
    a first layer disposed on one of said opposite sides of said insulating layer; and
    a second layer disposed on said other of said opposite sides of said insulating layer, wherein said first and second layers are affixed together within said plurality of passages of said insulating layer and include said plurality of vent holes therethrough at said plurality of passages of said insulating layer.

3. An insulating liner as defined in claim 2, wherein said fibrous substrate further comprises a polymeric, fibrous, carbon-based substrate and said aerogel material is composed of a nonporous silica matrix, and wherein said first and second layers are structural layers composed of a vinyl material and are hermetically sealed together about the periphery of said insulating layer and about the periphery of said plurality of vent holes.

4. An insulating liner as defined in claim 2, wherein said first and second layers are impermeable to air and are hermetically sealed together about the periphery of said insulating layer and about the periphery of said plurality of vent holes to thereby hermetically seal said insulating layer while permitting air flow through said vent holes.

5. An insulating liner as defined in claim 4, wherein said first and second layers are structural layers that comprise a vinyl material welded together about the periphery of said insulating layer.

6. An insulating liner as defined in claim 1, wherein said fibrous substrate further comprises a polymeric, fibrous substrate and said aerogel is composed of a nonporous silica matrix.

7. An insulating liner as defined in claim 6, wherein said fibrous substrate further comprises a carbon-based substrate or a polyester substrate.

8. An insulating liner as defined in claim 1, wherein said cover includes a sealed valve.

9. An insulating liner as defined in claim 8, wherein said sealed valve enables gas to be displaced from within said liner to at least reduce said gas pressure in said cover.

10. An insulating liner as defined in claim 9, wherein said sealed valve enables gas to be displaced from within said liner to yield a negative pressure condition therein.

11. An insulating liner as defined in claim 9, and adapted for use in an insulation assembly comprising permeable insulation layers disposed on opposite sides of said insulating liner, wherein said permeable insulation layers are sewn together at the periphery thereof and through the periphery of said insulating liner.

12. An insulating liner for an article of clothing comprising:
an insulating layer comprising a dust generating aerogel composite that includes a fibrous substrate carrying an aerogel material, said insulating layer having opposite sides with a plurality of passages extending therebetween; and
a cover hermetically encapsulating said insulating layer and including a valve to allow gas within said liner to pass therethrough.

13. An insulating liner as defined in claim 12, wherein said valve includes a body affixed to said cover and includes a resilient seal carried within said body that may be pierced to allow gas to be withdrawn from said liner.

14. An insulating liner as defined in claim 12 wherein said valve is a check valve and said liner is compressible to allow gas to be expelled from said liner through said check valve.

15. A method of forming an insulating liner for an article of clothing, comprising the steps of:
providing at least one insulating layer comprising a dust generating aerogel composite that includes a fibrous substrate carrying an aerogel material, said aerogel composite having a plurality of passages therethrough;
providing first and second sheets of an impermeable polymeric material;
encapsulating said at least one insulating layer between said first and second sheets;
cutting said first and second sheets to a desired shape; and
forming a plurality of vent holes through said first and second sheets at said plurality of passages.

16. A method as defined in claim 15, wherein said fibrous substrate further comprises a carbon-based substrate or a polyester substrate.

17. A method as defined in claim 15, wherein said encapsulating step is carried out by the following steps:
hermetically sealing said first and second sheets together within said passages of said at least one insulating layer; and
hermetically sealing said first and second sheets together about the periphery of said insulating layer disposed therebetween.

18. A method as defined in claim 15, wherein said step of providing said at least one insulating layer comprises cutting and punching said at least one insulating layer from a bulk supply of insulation material to define a size and shape of said at least one insulating layer and said plurality of passages therethrough.

19. A method as defined in claim 18, wherein said encapsulating step comprises:
laying said at least one insulating layer over said first sheet;
disposing said second sheet over said at least one insulating layer; and
hermetically sealing said first and second sheets together about the periphery of said at least one insulating layer and about the periphery of said plurality of vent holes.

20. A method as defined in claim 18, wherein said encapsulating step comprises:
laying said at least one insulating layer over said first sheet;
disposing said second sheet over said at least one insulating layer;
positioning said sheets and said insulating layer in a high frequency ultrasonic welder below a die plate thereof having a die cutting surface and on a platen thereof, wherein said lower platen and upper die plate have said preferred contours and features of said insulating liner;
pressing said die plate against said platen with said sheets and insulating layer disposed therebetween while applying a high frequency to weld said sheets together about the periphery of said insulating layer and at said passages of said insulating layer to thereby encapsulate said insulating layer between said sheets; and
die-cutting the periphery of said sheets as well as said portions of said sheets that extend into said passages of said insulating layer, thereby forming said plurality of vent holes.

21. An insulating liner for an article of clothing produced by the method as defined in claim 15.

22. A method as defined in claim 15 wherein said encapsulating step is carried out in a vacuum chamber.

23. A method of forming an insulating liner for an article of clothing, comprising the steps of:
providing at least one insulating layer comprising a dust generating aerogel composite that includes a fibrous substrate carrying an aerogel material, said aerogel composite having a plurality of passages therethrough;
providing a cover of an impermeable polymeric material;
encapsulating said at least one insulating layer within said cover;
cutting said cover to a desired shape;
providing a valve in said cover; and
displacing gas from within said insulating liner through said valve to reduce gas pressure therein.

24. A method as defined in claim 23, wherein said displacing step comprises inserting a needle of a syringe through said valve in communication with the interior of said insulating liner, and actuating said syringe to withdraw said gas to yield a reduced pressure condition within said liner to enhance the insulative properties thereof.

25. A method as defined in claim 23, wherein said valve is a check valve and said displacing step comprises applying a compression force to said liner to expel gas through said valve and thereby reduce the interior volume of said liner to substantially the external size of the now-compressed said at least one insulating layer, and also comprises subsequently releasing the compression force to allow the compressed said at least one insulating layer to at least partially recover its original size and shape thereby tending to at least slightly increase the interior volume of said liner and thus yield a reduced pressure condition within said liner to enhance the insulative properties thereof.

26. A method as defined in claim 25, further comprising a step of using a welding machine to at least partially carry out said encapsulating and cutting steps as well as said displacing step.

27. A method as defined in claim 23, wherein said displacing step yields a reduction in gas pressure of about 25 to 75 Torr.

28. A method as defined in claim 23, wherein said encapsulating step is carried out in a vacuum chamber.

* * * * *